United States Patent [19]

Bethea et al.

[11] 4,299,993

[45] Nov. 10, 1981

[54] METHOD FOR INCREASING THE PRIMARY HYDROXYL END GROUPS IN POLYETHERS

[75] Inventors: Tristram W. Bethea, Akron; Shingo Futamura, Wadsworth, both of Ohio

[73] Assignee: The Firestone Tire & Rubber Company, Akron, Ohio

[21] Appl. No.: 126,223

[22] Filed: Mar. 3, 1980

[51] Int. Cl.$^3$ .................. C08G 65/20; C08G 65/08
[52] U.S. Cl. ........................... 568/617; 528/408; 528/417; 568/624; 568/625
[58] Field of Search ............... 528/408, 417; 568/617, 568/624, 625

[56] References Cited

U.S. PATENT DOCUMENTS

| | | | |
|---|---|---|---|
| 3,380,967 | 4/1968 | Lowe et al. | 568/624 X |
| 3,425,999 | 2/1969 | Axelrood et al. | 568/617 X |
| 4,038,296 | 7/1977 | Greif et al. | 568/625 X |
| 4,183,821 | 1/1980 | Langdon et al. | 568/617 X |

*Primary Examiner*—Earl A. Nielsen

[57] ABSTRACT

A method for increasing the primary hydroxyl end groups in polyethers includes the steps of charging a reaction vessel with tetrahydrofuran and propylene oxide, adding $BF_3$ or a $BF_3$-containing catalyst and then polymerizing the first pair of monomers to form a copolymer. After the first copolymerization is at least 60 percent complete, the method further includes the steps of adding ethylene oxide to the copolymer and unreacted monomers in the reaction vessel, and polymerizing the contents therein to form a terpolymer predominantly terminated by primary hydroxyl groups. The reaction is thereafter terminated and the terpolymer is separated from the remaining contents of the reaction vessel, washed and dried. The resulting terpolymer has from about 20 to about 80 weight percent of tetrahydrofuran, from about 10 to about 60 weight percent of propylene oxide, from about five to about 40 weight percent of ethylene oxide and at least 60 mole percent of terminal primary hydroxyl groups.

15 Claims, No Drawings

METHOD FOR INCREASING THE PRIMARY HYDROXYL END GROUPS IN POLYETHERS

TECHNICAL FIELD

The present invention relates to a method for increasing the primary hydroxyl end groups of polyethers. The polyethers in particular comprise terpolymers of cyclic ethers such as ethylene oxide, propylene oxide, trimethylene oxide and tetrahydrofuran. By utilizing the preferred method set forth herein, the terpolymers synthesized are predominantly terminated with primary hydroxyl groups.

Homopolymers of the cyclic ethers, i.e., poly(ethylene oxide), poly(propylene oxide) and poly(tetrahydrofuran) are well known. Hydroxy-terminated polymers of ethylene oxide and tetrahydrofuran have only primary hydroxyl groups, while the terminal hydroxyl groups of poly(propylene oxide) can be either primary or secondary. Copolymers from any two of these monomers are also known, however, those which have propylene oxide, such as the copolymer with tetrahydrofuran, prepared with $BF_3$ as a catalyst, have only about 35 mole percent primary hydroxyl end groups.

Copolymers having primary hydroxyl groups are preferred over those having some or all secondary hydroxyl end groups for many applications such as the preparation of polyurethanes. Copolymers of tetrahydrofuran and ethylene oxide should therefore be favored over those wherein one of the comonomers is propylene oxide, however, such copolymers tend to crystallize and therefore cannot readily be utilized in the preparation of polyurethanes. Although crystallinity can be decreased by increasing the amount of ethylene oxide, the attendant disadvantage is that copolymers having a high content of ethylene oxide also have an affinity for water which affinity can be deleterious to the properties of the resulting urethane products made therefrom. By substituting propylene oxide for either monomer, crystallinity is less of a problem; however, secondary hydroxyl end groups appear which decrease the amount of the desired primary hydroxyls.

BACKGROUND ART

Typical of the prior art synthesis of cyclic oxide copolymers is U.S. Pat. No. 3,344,088 which describes the copolymerization of tetrahydrofuran and propylene oxide or ethylene oxide utilizing $SiF_4$ as a catalyst. The patent discusses very low concentrations of the ethylene oxide or propylene oxide, e.g., five parts or less by weight based upon 100 parts of the tetrahydrofuran which, as might be expected, yields a solid crystalline product.

Similarly, copolymerization of tetrahydrofuran and ethylene oxide is also the subject of U.S. Pat. Nos. 3,359,332 and 3,644,567, each utilizing different catalysts. However, the amount of ethylene oxide utilized in the former patent is relatively low, that is one part in ten or 20 of tetrahydrofuran and generally a molar amount equal to the molar amount of the catalyst is employed. As such, the ethylene oxide merely functions as a co-catalyst in the polymerization of the tetrahydrofuran and hence, a crystalline product is obtained. The latter patent provides for the preparation of block copolymers of tetrahydrofuran and ethylene oxide as well as other monomers, but utilizing approximately equal amounts of both monomers.

None of these patents discusses the usefulness of a relatively low amount of ethylene oxide and a corresponding high percentage of primary hydroxyl end groups in a propylene oxide-containing copolymer, much less a method for preparing such a product. Thus, while these desirable properties have been sought, we have not seen a specific polymeric composition having these characteristics heretofore.

DISCLOSURE OF THE INVENTION

It is therefore an object of the present invention to provide a method for increasing the primary hydroxyl end groups in polyethers.

It is another object of the present invention to provide a method for increasing the primary hydroxyl end groups in polyethers comprising tetrahydrofuran and propylene oxide random copolymers by the addition of ethylene oxide.

It is yet another object of the present invention to provide a method for producing a terpolymer of tetrahydrofuran, propylene oxide and ethylene oxide that is totally amorphous, has a relatively low amount of ethylene oxide, and a predominantly or relatively high concentration of primary hydroxyl end groups.

It is still another object of the present invention to provide a novel terpolymer of tetrahydrofuran, propylene oxide and ethylene oxide that is amorphous, has a relatively low amount of ethylene oxide and a predominantly or relatively high concentration of primary hydroxyl end groups.

These and other objects of the present invention together with the advantages thereof over the prior art, which shall become apparent from the specification that follows, are accomplished as hereinafter described and claimed.

In general, the method of the present invention for increasing the primary hydroxyl end groups in polyethers includes the steps of charging a reaction vessel with tetrahydrofuran and propylene oxide, adding $BF_3$ or a $BF_3$-containing catalyst and then polymerizing the first pair of monomers to form a copolymer. After the first copolymerization is at least 60 percent complete, the method further includes the steps of adding ethylene oxide to the copolymer and unreacted monomers in the reaction vessel, and polymerizing the contents therein to form a terpolymer predominantly terminated by primary hydroxyl groups. The reaction is thereafter terminated and the terpolymer is separated from the remaining contents of the reaction vessel, washed and dried. Alternatively, the method may be practiced by adding ethylene oxide and the catalyst to a copolymer of tetrahydrofuran and propylene oxide.

The method further provides for adding at least one-half of the tetrahydrofuran to the reaction vessel with the propylene oxide and adding the remainder thereof when the ethylene oxide is added. For the second polymerization, addition of the ethylene oxide can be in a single charge or incrementally.

In addition to the method set forth herein, the present invention also provides for a novel polyether terpolymer having from about 20 to about 80 weight percent of tetrahydrofuran, from about 10 to about 60 weight percent of propylene oxide, from about five to about 40 weight percent of ethylene oxide and at least 60 mole percent of terminal primary hydroxyl groups.

PREFERRED MODE FOR CARRYING OUT THE INVENTION

Copolymerizable cyclic ethers utilized in the present invention include ethylene oxide, propylene oxide and tetrahydrofuran. Additionally, other cyclic ethers that could be employed in lieu of one or more of the foregoing would include trimethylene oxide, 1-methyl trimethylene oxide, 2-methyl trimethylene oxide, 1-butene epoxide and styrene epoxide.

The copolymerizations are conducted in the presence of $BF_3$ or a $BF_3$-containing catalyst, such as the commercially available boron trifluoride etherate, or a $BF_3$-tetrahydrofuran complex. The preferred amount is from about 0.001 to about 0.1 mole percent with approximately 0.01 mole percent of $BF_3$ being preferred. A greater amount will speed the polymerization; however, a greater exotherm will result, while a lesser amount results in too slow a reaction.

Although a solvent is not required, the polymerizations can be conducted in the presence of a suitable one, such as 1,2-dichloroethane, to help control heat evolution. In order to control the molecular weight of the resulting difunctional polymer, 1,4-butanediol is added, the amount being dependent upon the total amount of monomer charged and the desired molecular weight of the product. By way of example, if the desired number average molecular weight being sought is 1000, about four mole percent of 1,4-butanediol should be added. Of course, it will be understood by those skilled in the art, that this amount is not critical to the practice of the invention, that is, increasing the primary hydroxyl end groups in the polymer product, and therefore greater or lesser amounts of 1,4-butanediol can be added to decrease or increase the molecular weight as desired. Alternatively, other di- or trifunctional glycols, as well as water, can be used with equivalent results.

Regarding the composition of the resulting difunctional polymer, the amount of the different monomeric components, by weight percent, can vary as follows: tetrahydrofuran, from about 20 to about 80 with 60 weight percent being preferred; propylene oxide, from about 10 to about 60 with 30 weight percent being preferred; and ethylene oxide from about five to about 40 with 10 weight percent being preferred. While in practice, other ranges may be practical for certain embodiments, the considerations are that tetrahydrofuran content be lowered because of its relative cost compared to the other monomers and the tendency of crystallinity in greater concentrations; propylene oxide content be high enough to provide an amorphous product, but not so high that the concentration of secondary hydroxyl end groups increases beyond about 40 mole percent; and ethylene oxide content be relatively low, that is, not more than about 40 percent, in order to insure that the resultant terpolymer does not have an affinity for water but that the end groups are predominantly primary hydroxyls. By predominantly is meant at least 60 mole percent.

With respect to the actual polymerizations, we have found that combining various amounts of all three monomers initially, in the reaction vessel, produces a terpolymer product having unsatisfactorily low amounts of primary hydroxyl end groups, that is less than about 60 mole percent. Therefore, as discussed hereinabove, the preferred method involves a two-step polymerization; first the tetrahydrofuran and propylene oxide are copolymerized and then the ethylene oxide is added. As will be appreciated by those skilled in the art, the first copolymerization set forth hereinbelow is not novel but has been presented merely to provide one suitable method by which to obtain a copolymer of tetrahydrofuran and propylene oxide.

Copolymerization of the first two monomers is random and is allowed to proceed for a period of time of from about two hours to about 20 hours, with six hours being preferred, and at a temperature of from about $-30°$ C. to about 60° C. with $0° \pm 5°$ C. being preferred. The proper time for addition of the ethylene oxide is when copolymerization of the first two monomers is at least 60 percent complete. In our work this has been found to be after about six hours. In those instances where it may be preferred, the first polymerization can be omitted by starting with a copolymer of tetrahydrofuran and propylene oxide and adding to it ethylene oxide.

Addition of the ethylene oxide for either method can be in a single charge, in several increments or continuously over a period of time. While a single charge will work, we have found that the slow gradual addition over a period of time of from about two to about six hours gives the highest amounts of primary hydroxyl end grouping. If desired, an equal or slightly greater amount of the tetrahydrofuran, in addition to the original charge, can be added with the ethylene oxide.

No additional catalyst need be added for the second polymerization. Where ethylene oxide is added to an existing copolymer of tetrahydrofuran and propylene oxide, a charge of catalyst, as discussed hereinabove, should also be added. The temperature will rise during addition of the ethylene oxide and should be maintained preferably between about 0° to about 10° C. The second polymerization is generally terminated after about eight hours following the last addition of the ethylene oxide.

A typical laboratory synthesis of the terpolymer, utilizing incremental additions of ethylene oxide and tetrahydrofuran was conducted as follows:

EXAMPLE 1

1800 g of tetrahydrofuran, 750 g of propylene oxide, 750 g of 1,2-dichloroethane and 226.2 g of 1,4-butanediol were charged to the reactor and were equilibrated at $-5°$ C. Initiation was commenced with 5.89 ml (0.0479 mole) of boron trifluoride etherate in 150 ml of 1,2-dichloroethane, followed by an additional 150 ml of the solvent to rinse the port. Temperature within the reactor, under an inert atmosphere, rose to about $-3°$ C. and slowly dropped to $-6°$ C. overnight. After about 18 hours, a first sample was withdrawn and 6 separate charges, each of 100 g tetrahydrofuran and 100 g ethylene oxide, were added hourly. Polymerization, with constant stirring, was again allowed to proceed for about 18 hours after which the reaction was terminated with aqueous potassium hydroxide. The product of samples 1 and 2 were washed with distilled water, dried over anhydrous magnesium sulfate and concentrated on a rotary evaporator under a vacuum. NMR and GPC analysis of the three samples revealed the following:

Sample 1
53.5 wt% tetrahydrofuran
46.5 wt% propylene oxide
$\overline{M}n$ 677
only propylene oxide end groups formed
(35% 1° and 65% 2°)
Sample 2
53 wt% tetrahydrofuran 33 wt% propylene oxide
14 wt% ethylene oxide
$\overline{M}n$ 1119
87.5 mole% ethylene oxide end groups (1°)
12.5 mole% propylene oxide end groups (1° and 2°)

In Table I, Examples 2-30 represent additional polymerizations of the three monomers that were conducted. In Examples 2-17, terpolymers of tetrahydrofuran, propylene oxide and ethylene oxide were prepared with varying amounts of the monomers and by varying the additions during the second step i.e., ethylene oxide alone and with tetrahydrofuran as well as single and incremental charges thereof. Examples 18-22 represent similar compositions but with all monomers charged at once. In Example 23, all of the propylene oxide was added in the second step. Example 24 represents the copolymerization of tetrahydrofuran and propylene oxide alone. Examples 25-29 represent the one step copolymerization of tetrahydrofuran and ethylene oxide alone; and Example 30 represents the copolymerization of propylene oxide and ethylene oxide alone.

Abbreviations employed for the monomers in Table I are as follows: tetrahydrofuran, THF; propylene oxide, PO; and ethylene oxide, EO. Number average molecular weights $\overline{M}n$, for the products and the composition thereof were determined by $^{13}C$ NMR. For two step polymerizations, the time for the first polymerization reaction is given. Polymerization time after the second charge, where employed, was eight to 18 hours. Polymerizations conducted on the basis of a single step total charge were terminated after 18 hours. Details, including the catalyst and amount thereof, reaction temperatures, inert atmosphere and stirring were generally as set forth in Example 1 and therefore, have not been repeated.

TABLE I

| Ex. | Monomer initial charge (grams) | Initial polymerization time (hrs.) | Additional monomer charge (total) | Number of additions (equal) | Total monomers (grams) | Weight Percent | Mole Percent and type end groups | $\overline{M}n$ | Product Composition Weight Percent |
|---|---|---|---|---|---|---|---|---|---|
| 2 | 1800 THF | 18 | 600 THF | 6 at | 2400 THF | 64 | | 1139 | 60 THF |
|   | 750 PO |    | 600 EO  | 1 hr. | 750 PO | 20 | | | 30 PO |
|   |        |    |         | intervals | 600 EO | 16 | 88 EO | | 10 EO |
| 3 | 2400 THF | 6 | 600 EO | 1 | 2400 THF | 64 | | 1171 | 59 THF |
|   | 750 PO |   |        |   | 750 PO | 20 | | | 30 PO |
|   |        |   |        |   | 600 EO | 16 | 69 EO | | 11 EO |
| 4 | 2400 THF | 17 | 600 EO | 6 at | 2400 THF | 64 | | 1043 | 60 THF |
|   | 750 PO |    |        | 1 hr. | 750 PO | 20 | | | 30 PO |
|   |        |    |        | intervals | 600 EO | 16 | 83 EO | | 10 EO |
| 5 | 2400 THF | 18 | 800 EO | 1 | 2400 THF | 61 | | 1260 | 56 THF |
|   | 750 PO |    |        |   | 750 PO | 19 | | | 26 PO |
|   |        |    |        |   | 800 EO | 20 | 74 EO | | 20 EO |
| 6 | 2400 THF | 6 | 800 EO | 1 | 2400 THF | 61 | | 1518 | 53 THF |
|   | 750 PO |   |        |   | 750 PO | 19 | | | 25 PO |
|   |        |   |        |   | 800 EO | 20 | 76 EO | | 22 EO |
| 7 | 2400 THF | 19 | 800 EO | 1[a] | 2400 THF | 61 | | 1304 | 48 THF |
|   | 750 PO |    |        |   | 750 PO | 19 | | | 26 PO |
|   |        |    |        |   | 800 EO | 20 | 70 EO | | 26 EO |
| 8 | 2000 THF | 19 | 1200 THF | 1 | 3200 THF | 64 | | 1114 | 56 THF |
|   | 1000 PO |    | 800 EO   |   | 1000 PO | 20 | | | 30 PO |
|   |         |    |          |   | 800 EO | 16 | 75 EO | | 14 EO |
| 9 | 2000 THF | 6 | 1200 THF | 1 | 3200 THF | 64 | | 1273 | 57 THF |
|   | 1000 PO |   | 800 EO   |   | 1000 PO | 20 | | | 31 PO |
|   |         |   |          |   | 800 EO | 16 | 82 EO | | 12 EO |
| 10 | 2000 THF | 17 | 1200 THF | 2 at | 3200 THF | 64 | | 1134 | 58 THF |
|    | 1000 PO |    | 800 EO   | 8 hour | 1000 PO | 20 | | | 30 PO |
|    |         |    |          | intervals | 800 EO | 16 | 82 EO | | 12 EO |
| 11 | 2000 THF | 5 | 1200 THF | 2 at | 3200 THF | 64 | | 1279 | 54 THF |
|    | 1000 PO |   | 800 EO   | three hr. | 1000 PO | 20 | | | 26 PO |
|    |         |   |          | intervals | 800 EO | 16 | 80 EO | | 20 EO |
| 12 | 2000 THF | 4 | 1200 THF | 2 at | 3200 THF | 64 | | 1110 | 60 THF |
|    | 1000 PO |   | 800 EO   | four hr. | 1000 PO | 20 | | | 27 PO |
|    |         |   |          | intervals | 800 EO | 16 | 73 EO | | 13 EO |
| 13 | 1260 THF | 5 | 600 THF | 2 at | 1860 THF | 58 | | 2029 | 64 THF |
|    | 540 PO  |   | 800 EO  | three hr. | 540 PO | 17 | | | 17 PO |
|    |         |   |         | intervals | 800 EO | 25 | 69 EO | | 19 EO |
| 14 | 1260 THF | 3 | 300 THF | 2 at | 1860 THF | 58 | | 1795 | 61 THF |
|    | 540 PO  |   | 500 EO  | five hr. | 540 PO | 17 | | | 20 PO |
|    |         |   |         | intervals | 800 EO | 25 | 60 EO | | 19 ED |
| 15 | 1000 THF | 3 | 600 THF | 2 at | 1600 THF | 64 | | 2364 | 63 THF |
|    | 500 PO  |   | 400 EO  | five hr. | 500 PO | 20 | | | 25 PO |
|    |         |   |         | intervals | 400 EO | 16 | 74 EO | | 12 EO |
| 16 | 1000 THF | 3 | 600 THF | 2 at | 1600 THF | 64 | | 2360 | 64 THF |
|    | 500 PO  |   | 400 EO  | three hr. | 500 PO | 20 | | | 26 PO |
|    |         |   |         | intervals[a] | 400 EO | 16 | 83 EO | | 10 EO |
| 17 | 960 THF | — | — | — | 960 THF | 60 | | 1448 | 70 THF |
|    | 80 PO  |   |   |   | 80 PO | 5 | | | 8 PO |
|    | 560 EO |   |   |   | 560 EO | 35 | 94 EO | | 22 EO |
| 18 | 3200 THF | — | — | — | 3200 THF | 64 | | 1105 | 56 THF |
|    | 1000 PO |   |   |   | 1000 PO | 20 | | | 28 PO |
|    | 800 EO  |   |   |   | 800 EO | 16 | 49 EO | | 16 EO |
| 19 | 1080 THF | — | — | — | 1080 THF | 64 | | 1100 | 60 THF |
|    | 377 PO  |   |   |   | 377 PO | 21 | 66 PO | | 29 PO |
|    | 286 EO  |   |   |   | 286 EO | 15 | 34 EO | | 11 EO |
| 20 | 1080 THF | | | | 1080 THF | 55 | | 757 | 56 THF |

TABLE I-continued

| Ex. | Monomer initial charge (grams) | Initial polymerization time (hrs.) | Additional monomer charge (total) | Number of additions (equal) | Total monomers (grams) | Weight Percent | Mole Percent and type end groups | $\overline{M}n$ | Product Composition Weight Percent |
|---|---|---|---|---|---|---|---|---|---|
|  | 377 PO |  |  |  | 377 PO | 18 | 40 PO |  | 23 PO |
|  | 572 EO |  |  |  | 572 EO | 27 | 60 EO |  | 21 EO |
| 21 | 1080 THF | — | — | — | 1080 THF | 57 |  | 1844 | 52 THF |
|  | 377 PO |  |  |  | 377 PO | 20 | 40 PO |  | 25 PO |
|  | 440 EO |  |  |  | 440 EO | 23 | 60 EO |  | 23 EO |
| 22 | 1080 THF | — | — | — | 1080 THF | 68 |  | 1043 | 68 THF |
|  | 290 PO |  |  |  | 290 PO | 18 | 60 PO |  | 26 PO |
|  | 220 EO |  |  |  | 220 EO | 14 | 40 EO |  | 6 EO |
| 23 | 1440 THF | — | 290 PO | 1 | 1440 THF | 77 |  | 4948 | 49 THF |
|  | 132 EO |  |  |  | 290 PO | 16 | 43 PO |  | 24 PO |
|  |  |  |  |  | 132 EO | 7 | 57 EO |  | 27 EO |
| 24 | 1500 THF | — | — | — | 1500 THF | 75 |  | 1381 | 61 THF |
|  | 500 PO |  |  |  | 500 PO | 25 | 100 PO |  | 39 PO |
| 25 | 900 THF | — | — | — | 900 THF | 60 |  | 1437 | 62 THF |
|  | 600 EO |  |  |  | 600 EO | 40 | 100 EO |  | 38 PO |
| 26 | 1050 THF | — | — | — | 1050 THF | 70 |  | 1120 | 60 THF |
|  | 450 EO |  |  |  | 450 EO | 30 | 100 EO |  | 40 EO |
| 27 | 1350 THF | — | — | — | 1350 THF | 90 |  | 764 | 82 THF |
|  | 150 EO |  |  |  | 150 EO | 10 | 88 EO |  | 18 EO |
| 28 | 1600 THF | — | — | — | 1600 THF | 80 |  | 956 | 72 THF |
|  | 400 EO |  |  |  | 400 EO | 20 | 100 EO |  | 28 EO |
| 29 | 1600 THF | — | — | — | 1600 THF | 80 |  | 2046 | 76 THF |
|  | 400 EO |  |  |  | 400 EO | 20 | 100 EO |  | 24 EO |
| 30 | 871 PO | — | — | — | 871 PO | 66 | 71 PO | 741 | 72 PO |
|  | 440.5 EO |  |  |  | 440.5 EO | 34 | 29 EO |  | 28 EO |

*a*large exotherm resulted

With reference first to Example 17, 94 mole percent primary hydroxyl end groups was obtained in a terpolymer having 22 weight percent ethylene oxide, but only eight weight percent propylene oxide. Owing to the relatively low amount of propylene oxide, any crystallinity of the product would decrease its usefulness for polyurethanes. In Examples 20-22 it is seen that the combination of all three monomers in a single charge does not yield a greater concentration of ethylene oxide or primary hydroxyl end groups in the terpolymer than 60 mole percent despite ethylene oxide monomer amounts of up to 27 weight percent. These examples typify the results obtainable prior to the method of the present invention. Although greater concentrations of primary hydroxyl end groups would be desirable, greater concentrations of tetrahydrofuran or ethylene oxide are not.

Examples 2-16, as 1, demonstrate the unexpectedly better results of employing the method of the present invention wherein ethylene oxide contents as low as 16 weight percent can be suitably employed to yield a polymer product having about 88 mole percent primary hydroxyl end groups. It is further evidenced, that the best results were obtained when the additional or second monomer charge was made incrementally either employing tetrahydrofuran and ethylene oxide (Example 2) or ethylene oxide alone (Example 4). However, even those instances where the additional monomer charge was complete in one (Examples 3 and 5-9) at least 69 mole percent primary hydroxyl end groups were obtained. Significance is attributed to the fact that none of these latter examples utilized more than 20 weight percent of ethylene oxide.

With respect to Example 23, the weight percent of the product composition was determined, however, it should be pointed out that the relatively high molecular weight of the polymer can cause considerable error in the NMR determination of the molecular weight and composition of the end groups. In Example 24, ethylene oxide was not employed and only hydroxyl end groups from propylene oxide were found; these hydroxyls were 35 mole percent primary and 65 mole percent secondary. Examples 25-29 provided substantially total primary hydroxyl end grouping, and Example 30 showed a significant reduction in such groups, where only ethylene oxide and propylene oxide were employed, despite a relatively high content of ethylene oxide.

It is to be remembered that the examples appearing in Table I as well as Example 1, have been provided merely to present results obtainable by practice of the present invention. Inasmuch as it is known to copolymerize substituted cyclic ethers of the type employed in our examples as well as other cyclic ethers, we do not intend to limit our invention to the three cyclic ethers exemplified herein. As further stated hereinabove, the preferred method includes the step of a second polymerization from a monomeric charge that can be added all at once or incrementally.

In addition to the method disclosed herein, we believe that the terpolymers obtainable therefrom are also novel. That is, while terpolymers of tetrahydrofuran, propylene oxide and ethylene oxide may have existed heretofore, we believe ours is the first to have an ethylene oxide content of less than about 30 weight percent and a primary hydroxyl end group concentration of at least 60 mole percent and up to about 90 mole percent.

Thus, it can be seen that the disclosed invention carries out the objects set forth hereinabove. As will be apparent to those skilled in the art, the concentration of primary hydroxyl end groups in polyethers catalyzed by boron trifluoride can be increased significantly by the method of the present invention and it is believed that the determination of suitable cyclic ethers and amounts thereof can be made, depending upon the results desired, without departing from the spirit of the invention herein disclosed and described. Moreover, the scope of the invention shall include all modifications and variations that fall within the scope of the attached claims.

We claim:

1. A method for increasing the primary hydroxyl end groups in polyethers comprising the steps of:
   charging a reaction vessel with tetrahydrofuran and propylene oxide;
   adding a catalyst selected from the group consisting of $BF_3$ and $BF_3$-ether complexes;
   polymerizing said monomers to form a copolymer;
   adding ethylene oxide to said copolymer and unreacted monomers;
   polymerizing said ethylene oxide with said copolymer and unreacted monomes to form a terpolymer predominantly terminated by primary hydroxyl groups; and
   thereafter terminating the reaction and separating said terpolymer from the remaining contents of said reaction vessel.

2. A method, as set forth in claim 1, wherein the amount of tetrahydrofuran monomer employed is from about 20 to about 80 weight percent; the amount of propylene oxide monomer employed is from about 10 to about 60 weight percent; and the amount of ethylene oxide monomer employed is from about 5 to about 40 weight percent.

3. A method, as set forth in claim 2, wherein at least one-half of said tetrahydrofuran monomer is added during the step of polymerizing said monomers and the remainder thereof is added during the step of adding ethylene oxide.

4. A method, as set forth in claim 3, wherein the step of polymerizing tetrahydrofuran and propylene oxide is conducted to at least 60 percent completion.

5. A method, as set forth in claims 1 or 4, wherein the step of adding said ethylene oxide is performed incrementally in at least two charges.

6. A method, as set forth in claims 1 or 4, wherein the step of adding said ethylene oxide is performed all at once.

7. A method, as set forth in claims 1 or 4, wherein the step of adding said ethylene oxide is performed continuously during said step of polymerizing.

8. A method, as set forth in claim 4, wherein the step of polymerizing said monomers is conducted at a temperature of from about $-30°$ to about $60°$ C. for a period of time of from about two to about 20 hours; and wherein the step of polymerizing said ethylene oxide is conducted at a temperature of from about $0°$ to about $10°$ C. for a period of time of about eight hours.

9. A method for increasing the primary hydroxyl end groups in polyethers comprising the steps of:
   adding ethylene oxide and tetrahydrofuran to a copolymer of tetrahydrofuran and propylene oxide;
   adding a catalyst selected from the group consisting of $BF_3$ and $BF_3$-ether complexes;
   polymerizing said ethylene oxide and tetrahydrofuran with said copolymer to form a terpolymer predominantly terminated by primary hydroxyl groups; and
   thereafter terminating the reaction and separating said terpolymer from the remaining contents of said reaction vessel.

10. A method, as set forth in claim 9, wherein the step of adding said ethylene oxide is performed incrementally in at least two charges.

11. A method, as set forth in claim 9, wherein the step of adding said ethylene oxide is performed all at once.

12. A method, as set forth in claim 9, wherein the step of adding said ethylene oxide is performed continuously during said step of polyermizing.

13. A method, as set forth in claim 9, wherein the step of polymerizing said ethylene oxide is conducted at a temperature of from about $0°$ to about $10°$ C. for a period of time of about eight hours.

14. A polyether terpolymer comprising:
   from about 20 to about 80 weight percent of tetrahydrofuran;
   from about 10 to about 60 weight percent of propylene oxide;
   from about five to about 40 weight percent of ethylene oxide; and
   at least 60 mole percent of terminal primary hydroxyl groups.

15. A polyether terpolymer, as set forth in claim 14, comprising:
   60 weight percent of tetrahydrofuran;
   30 weight percent of propylene oxide;
   10 weight percent of ethylene oxide; and
   at least 60 and up to about 88 mole percent of terminal primary hydroxyl groups.

* * * * *